United States Patent [19]

Kim

[11] Patent Number: 5,481,627
[45] Date of Patent: Jan. 2, 1996

[54] METHOD FOR RECTIFYING CHANNEL ERRORS IN A TRANSMITTED IMAGE SIGNAL ENCODED BY CLASSIFIED VECTOR QUANTIZATION

[75] Inventor: Jong-Rak Kim, Seoul, Rep. of Korea

[73] Assignee: Daewoo Electronics Co., Ltd., Seoul, Rep. of Korea

[21] Appl. No.: 299,179

[22] Filed: Aug. 31, 1994

[30] Foreign Application Priority Data

Aug. 31, 1993 [KR] Rep. of Korea .................. 1993-17192

[51] Int. Cl.$^6$ ...................................................... G06K 9/40
[52] U.S. Cl. ............................ 382/254; 382/266; 348/616
[58] Field of Search ..................................... 382/9, 21, 56, 382/57, 54, 36, 22, 38, 45, 254, 266; 341/94, 106; 371/30; 358/467; 348/616

[56] References Cited

U.S. PATENT DOCUMENTS

| | | | |
|---|---|---|---|
| 4,807,033 | 2/1989 | Keesen et al. | 358/167 |
| 4,843,630 | 6/1989 | Catros et al. | 382/6 |
| 5,153,748 | 10/1992 | Moyer | 358/443 |
| 5,257,116 | 10/1993 | Suzuki | 358/465 |
| 5,365,604 | 11/1994 | Kwok et al. | 382/54 |

*Primary Examiner*—Michael T. Razavi
*Assistant Examiner*—Peter Park
*Attorney, Agent, or Firm*—Anderson Kill Olick & Oshinsky

[57] ABSTRACT

A novel method for concealing or rectifying channel errors present in a decoded image signal which has been transmitted in a compressed form by using a classified vector quantization technique comprises a step for estimating the class for a current block by detecting boundary edges at each of four groups of neighboring pixels; and a step for estimating the representative vector for the current block by calculating a multiple number of side-matching functions and choosing the candidate vector producing the smallest side-matching function as the representative vector for the current block.

2 Claims, 7 Drawing Sheets

UPPER BLOCK

| | $U_{41}$ | $U_{42}$ | $U_{43}$ | $U_{44}$ | |
|---|---|---|---|---|---|
| $L_{14}$ | $C_{11}$ | $C_{12}$ | $C_{13}$ | $C_{14}$ | $R_{11}$ |
| $L_{24}$ | $C_{21}$ | \multicolumn{2}{c}{CURRENT} | $C_{24}$ | $R_{21}$ |
| $L_{34}$ | $C_{31}$ | \multicolumn{2}{c}{BLOCK} | $C_{34}$ | $R_{31}$ |
| $L_{44}$ | $C_{41}$ | $C_{42}$ | $C_{43}$ | $C_{44}$ | $R_{41}$ |
| | $D_{11}$ | $D_{12}$ | $D_{13}$ | $D_{14}$ | |

LEFT BLOCK

RIGHT BLOCK

LOWER BLOCK

METHOD FOR RECTIFYING CHANNEL ERRORS IN A TRANSMITTED IMAGE SIGNAL ENCODED BY CLASSIFIED VECTOR QUANTIZATION

FIELD OF THE INVENTION

The present invention relates to a method for decoding an image signal; and, more particularly, to a method for concealing or rectifying channel errors present in a decoded image signal which has been transmitted in a compressed form using a classified vector quantization technique.

DESCRIPTION OF THE PRIOR ART

In digital image processing systems such as video telephone and high definition television, various data compression techniques are used to reduce a large volume of digital data defining each frame of image signals. Vector quantization is one of such compression techniques that has been found to be efficient for image compression in recent years.

Vector quantization is a technique for quantizing an input image signal in units of blocks. The input image signal is divided into blocks of N unit signals; and each block is represented by an N-dimensional input vector. Thereafter, each input vector is mapped into one of a set of predetermined candidate vectors constituting a codebook.

An input vector is represented by a representative vector which is one of the candidate vectors in the codebook. Specifically, each input vector is individually quantized or mapped into a most similar candidate vector so as to minimize a mapping distortion, i.e., quantization error.

Compression is achieved by using an index for each candidate vector, i.e., a codeword index, instead of the vector itself, for the purpose of economizing the transmission and storage burdens. The codeword index may be further compressed by using, e.g., a variable length coding (VLC) method.

The basic principles for the vector quantization method and various methods for generating a codebook are described in, e.g., "Vector Quantization and Signal Compression" by A. Gersho and R. M. Gray, Kluwer Academic Publishers, 1991.

The number of candidate vectors in a codebook and the codebook contents are largely dependent on the statistical characteristics of the input vectors. In case that the input vectors have a wide variety, the number of candidate vectors in the codebook becomes very large. In terms of the coding efficiency, a smaller codebook obviously yields a better performance provided the error generated in the quantization process remains the same. In general, however, if a smaller sized codebook is used, the peripheral area of an image block may not be reproduced satisfactorily, thereby deteriorating the quality of the decoded image.

This problem can be solved by using a classified vector quantization method wherein each input vector is categorized into one of several classes, each class being defined by a specific pattern, e.g., an edge pattern of a block, and being represented by a separate codebook.

In the classified vector quantization method, a plurality of smaller codebooks instead of a large one is used, wherein each codebook is adapted to represent a class of input vectors having similar characteristics. In an image encoding system employing the classified vector quantization method, an input vector is first classified into one of a plurality of classes and a corresponding codebook is determined; a representative vector, i.e., a candidate vector which best matches the input vector is selected from the codebook; and a class name representing the class for the input vector and the codeword index of the representative vector are coded by using, e.g., VLC for the transmission thereof.

Figure 1:
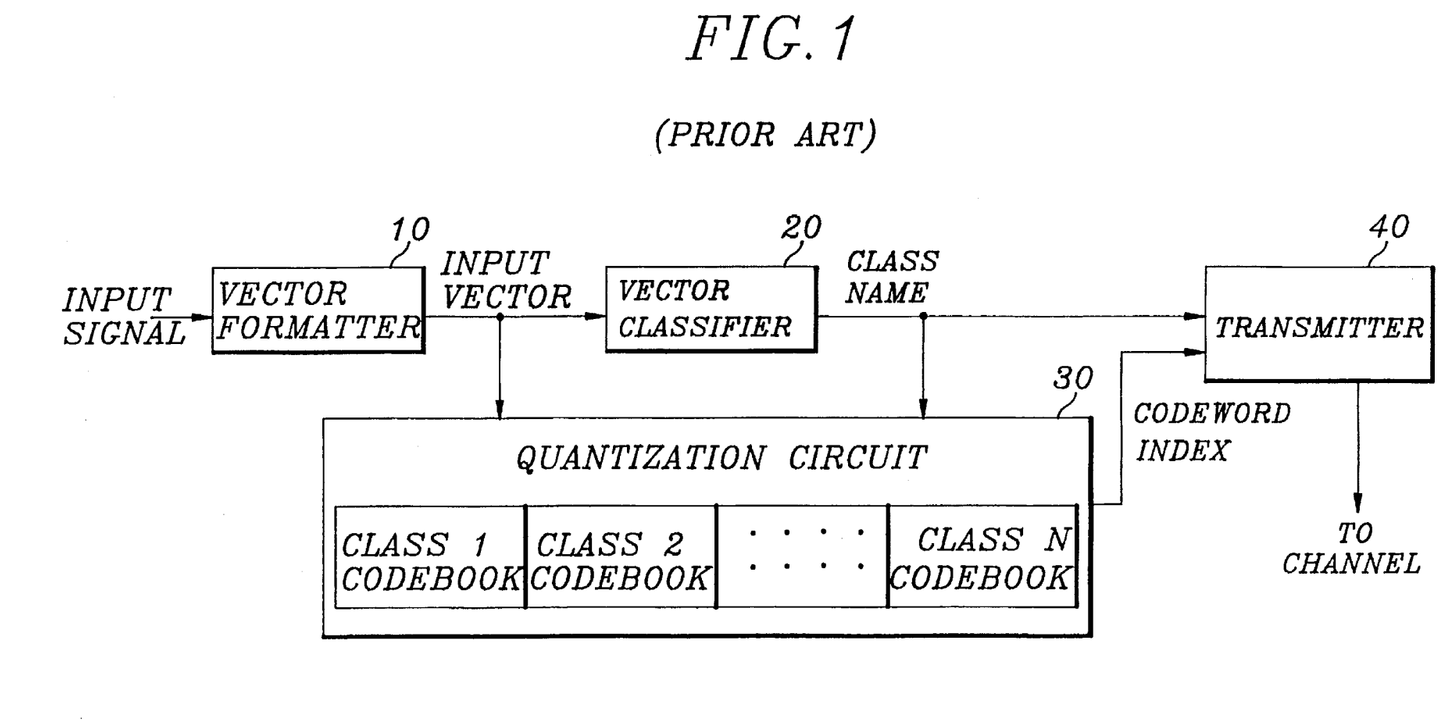
FIG. 1 is a block diagram of a prior art image encoding system that employs a classified vector quantization method.

FIG. 1 shows a block diagram of a conventional image encoding system employing the classified vector quantization method described above. In relation to the vector quantization method, a classification scheme for classifying input vectors into a plurality of classes and a plurality of codebooks, each of which corresponds to each of the classes, is determined by considering the system characteristics, e.g., the input image statistics and the targeted compression ratio of the encoding system.

As shown in FIG. 1, an input signal is first fed to a vector formatter 10 wherein a frame of the image is divided into a multiplicity of blocks of a predetermined size, e.g., 4×4, thereby providing each block as an input vector for the classified vector quantization to be carried out thereafter. The input vector is coupled to a quantization circuit 30, and to a vector classifier 20 in which the input vector is categorized into one of a plurality of classes. In a conventional classified vector quantization method, an edge pattern is assigned to each class and each input vector is compared with each edge pattern to determine the most similar pattern. The class with the most similar pattern is determined as the class for the input vector.

The class information, i.e., the class name, determined at the vector classifier 20 is fed to the vector quantization circuit 30 and to a transmitter 40. The vector quantization circuit 30 contains a plurality of codebooks, each of which includes a various number of candidate vectors and corresponding codeword indices, thereby performing the quantization operation on an input vector using a different codebook chosen according to the class name of the input vector.

Specifically, one of the codebooks is selected in response to the class information and then the input vector is quantized to a closest candidate vector selected from the codebook. Usually, the codebook is in the form of a lookup table and the quantization process is implemented as a table lookup operation. Normally, instead of the representative vector, a codeword index is used to represent the input vector. The codeword index can be constituted with a smaller number of bits than the input vector. The codeword index and the class information for a current input vector are fed to the transmitter 40 for further processing, e.g., variable length coding, and for the transmission thereof.

In a decoding system which corresponds to the encoding system described above, the input vector is recovered easily from the class name and the codeword index by using a reverse process referencing a lookup table.

Since, however, channel errors are apt to occur during the transmission process, various error-control coding methods are employed to reduce or rectify the channel errors. In the conventional error-control coding methods, extra bits are appended to the original code to detect and correct the channel errors during the decoding process. Correction of errors in this manner is possible only to a limited extent, however. If a larger number of errors occurs than the capacity allowed in an error correction scheme, even the image data may be designated as an error without any possibility of correcting the wrong designation. To deal with such problem, therefore, various error concealment schemes such as side-matching method have been proposed to recover or estimate the image signal, thereby to compensate for the degradation which may have occurred in the transmission process( see, e.g., U.S. Pat. No. 5,247,363 issued to H. Sun et al.). However, such prior art error concealment methods remain unsatisfactory as they fail to fully take into account the characteristics of the classified vector quantization method.

SUMMARY OF THE INVENTION

It is, therefore, a primary object of the present invention to provide an improved method for concealing channel errors in an image signal transmitted in a compressed form by using a classified vector quantization method.

In accordance with the present invention, there is provided a method for estimating a class and a representative vector for a current block for use in an image decoding system for decoding an image signal encoded by using a classified vector quantization method, wherein the image signal is divided into a multiplicity of blocks, each of said blocks being classified into one of a plurality of classes based on the edge pattern thereof, each of said classes corresponding to a codebook including a multiple number of candidate vectors, and each of the blocks included in the same class being represented by a representative vector selected from the candidate vectors included in the codebook corresponding to the class, said method comprising the steps of:

detecting boundary edges at each of four groups of neighboring pixels to the current block, wherein each group of the neighboring pixels is located at a boundary of the current block and included in one of four neighboring blocks to the current block;

estimating the edge pattern for the current block by connecting the detected boundary edges;

determining the class for the current block based on the estimated edge pattern;

calculating a multiple number of side-matching functions, each of said functions representing the difference between the boundary pixels of the current block and the neighboring pixels to the current block, wherein each of said side-matching functions is calculated based on each of the multiple number of candidate vectors included in the codebook corresponding to the class where the current block belongs; and choosing the candidate vector producing the smallest side-matching function as the representative vector for the current block.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

As stated previously, a classified vector quantization is fully defined by a classification scheme for classifying input vectors into a plurality of classes and a plurality of codebooks, each of which corresponds to each of the classes.

Figure 2:
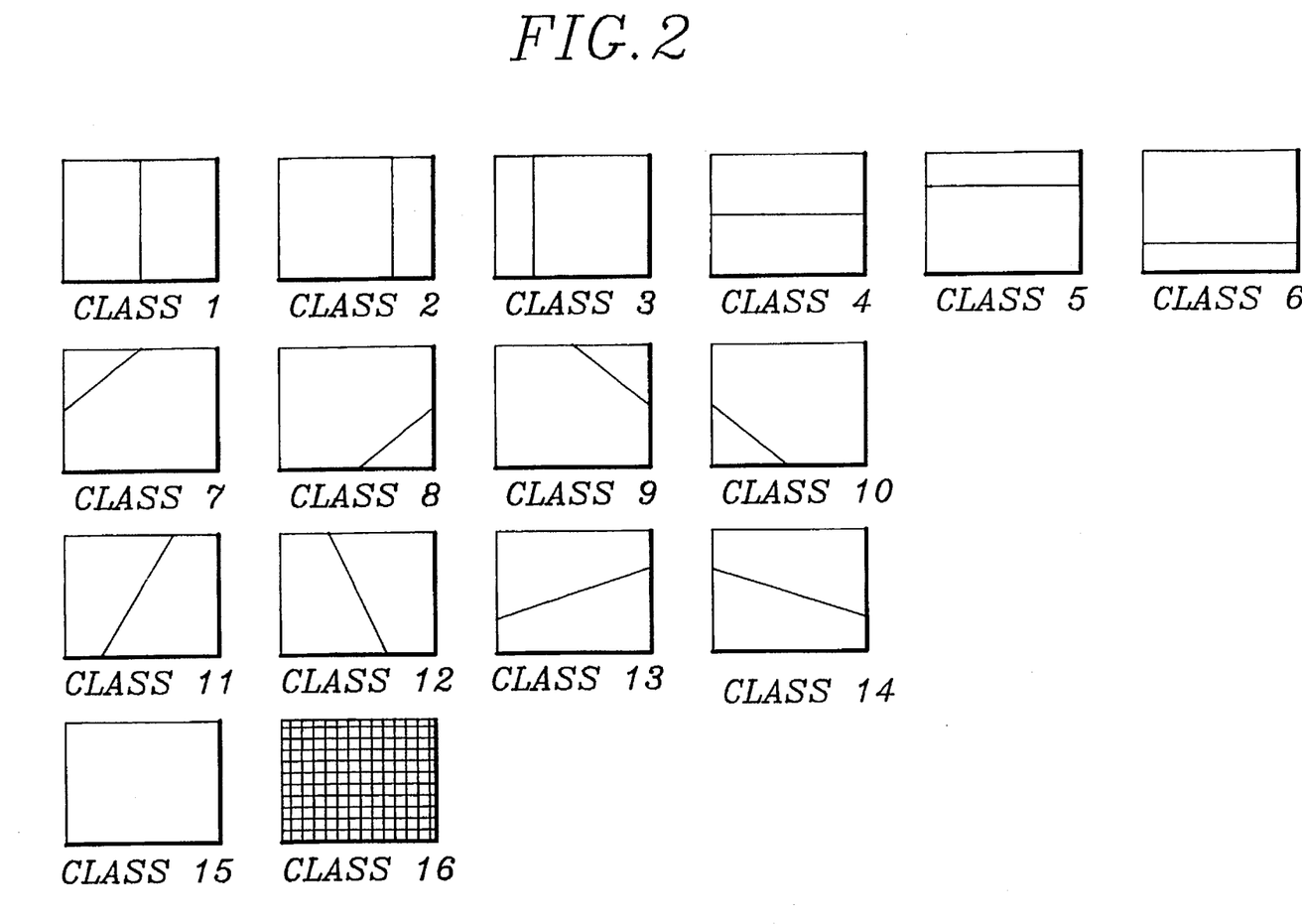
FIG. 2 illustrates edge patterns for input blocks each of which represents a different class in the classified vector quantization method in accordance with the present invention.

Referring now to FIG. 2, a plurality of illustrative edge patterns of input vectors are presented. Each pattern represents a different class or codebook in the classified vector quantization method in accordance with the present invention.

Each square box with a line in it denotes an edge pattern of image blocks, wherein the line represents an edge. In other words, input image blocks are classified by the shape and the position of an edge located therein. Classes 1 through 14 shown in FIG. 2 are the edged classes used to classify the input blocks according to the shape of the edges therein. The input blocks having no edge are classified as non-edged classes, i.e., classes 15 and 16.

Specifically, an input block which has a vertical edge in the center is classified as class 1, an input block which has a slanted vertical edge is classified as class 11 or 12, and so on.

Referring back to the non-edged classes, class 15 may be chosen to represent a smooth block while class 16 may be designated to a textured block, wherein the smooth block and the textured block are defined as the input blocks whose variance in the pixel values is small and large, respectively.

To determine the class for an input vector, therefore, an edge in the input image block need be first detected. Once the edge in each input block is detected, the classification can be readily made by using, e.g., a pattern matching method for choosing a most similar pattern with the edge of the input block.

Various classification schemes other than the one depicted herein may be practiced provided that the input vectors included in the same class have similar characteristics.

As mentioned above, a codebook is assigned for each class, wherein the codebook includes a various number of candidate vectors for representing the input vectors which are classified together. Each codebook may also include the codeword indices, each of which representing one of the candidate vectors.

Figure 3:
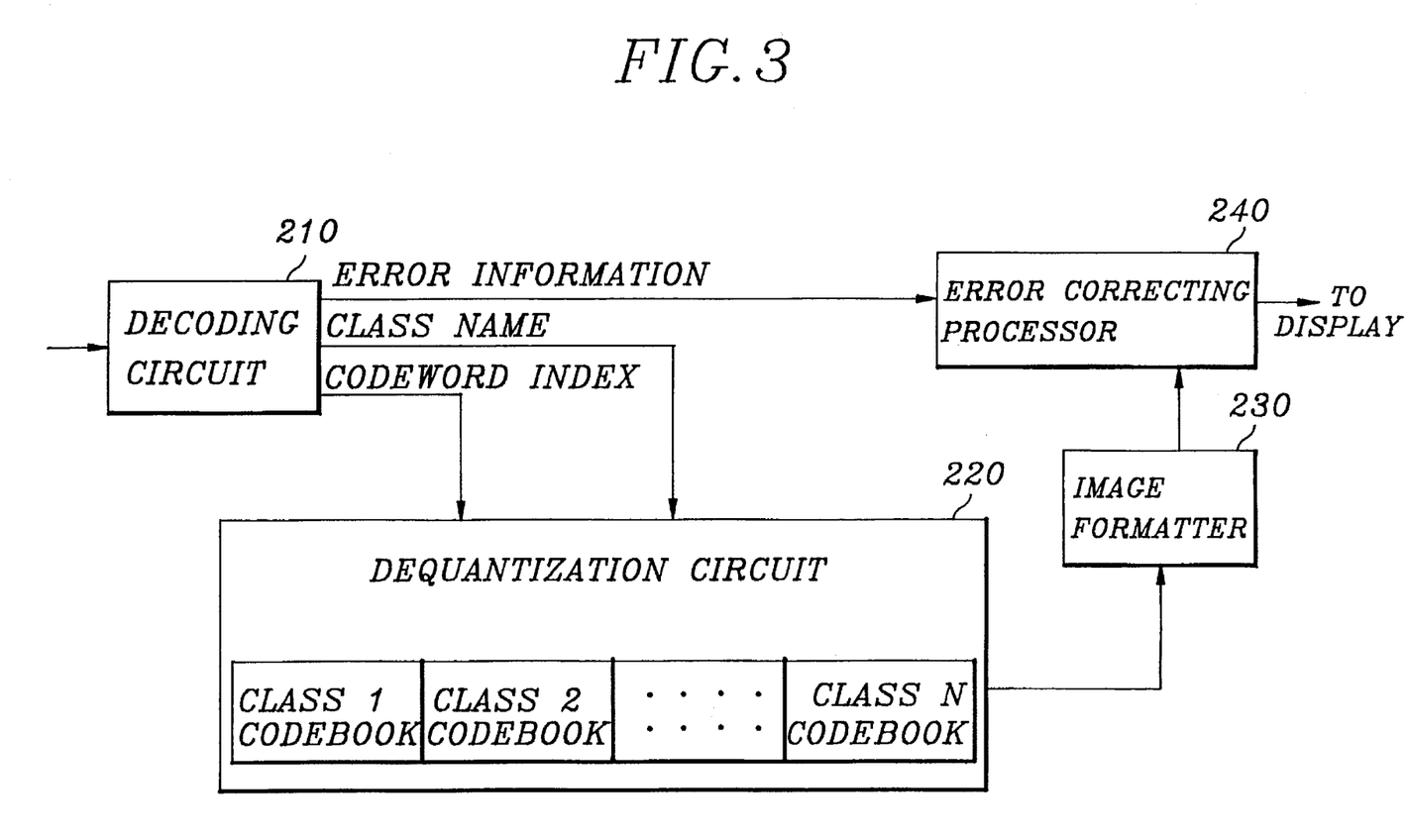
FIG. 3 represents a block diagram of an image decoding system for decoding a classified-vector-quantized image signal in accordance with the present invention.

With reference to FIG. 3, there is shown a block diagram of an image decoding system for decoding a signal provided from, e.g., the image encoding system shown in FIG. 1 through a transmission channel.

A transmitted signal is fed to a decoding circuit 210 wherein the signal is decoded into class informations or names and codeword indices. Errors which may have occurred in the transmission channel are also detected at the decoding circuit 210. Such errors can be detected using various known methods, e.g., by interpreting the extra bits appended in the encoding part.

A class name and a corresponding codeword index for a current block to be decoded are coupled to a dequantization circuit 220. The error information about the current block is fed to an error correcting processor 240 wherein correct pixel values of the current block are estimated in accordance with the method of the present invention.

The dequantization circuit 220 includes a plurality of codebooks which matches the codebooks used in the encoding process. At the dequantization circuit 220, a representative vector is retrieved in response to the codeword index from the codebook selected in response to the class information, and provided to an image formatter 230.

At the image formatter 230, a multiplicity of the representative vectors, i.e., the pixel values of the reconstructed blocks, are rearranged to form an image frame to be provided to the error correcting processor 240.

At the error correcting processor 240, in response to the error information fed from the decoding circuit 210, the correct class information and representative vector are determined in case the current block contains incorrect data. The class and the representative vector for the current block are estimated by using a method described hereinafter.

Figure 4A:
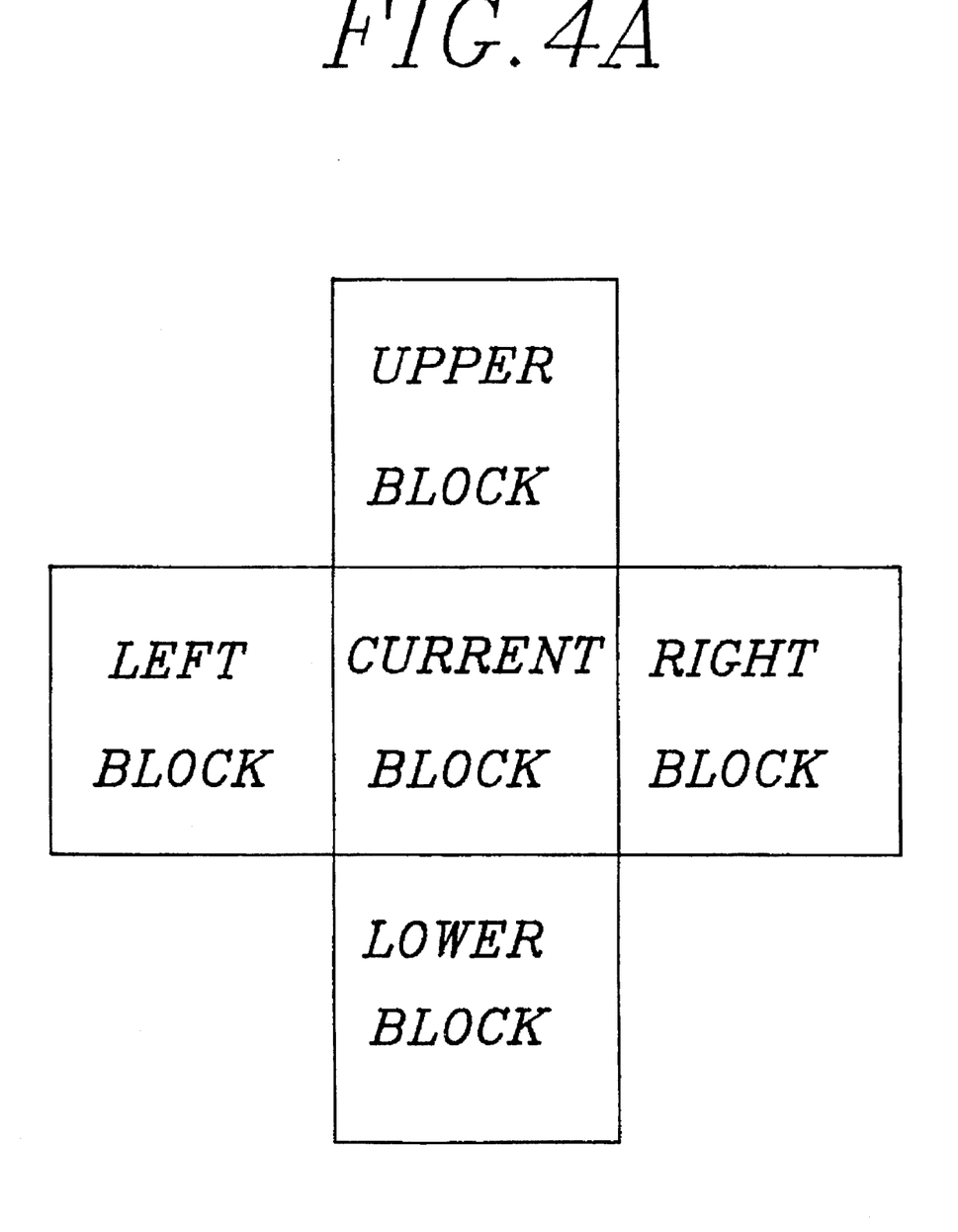
FIGS. 4A and 4B offer schematic representations of image blocks which are useful in describing the present invention.

In FIG. 4A, a current block in the center, and its neighboring 4 blocks, i.e., an upper block, a right block, a left block and a lower block, are presented. The boundary pixels in the current block and the neighboring pixels to the current block, i.e., the boundary pixels in the neighboring blocks which are located along the borderline of the current block, are also presented and named in FIG. 4B. For the purpose of illustration, the size of each block, which is the unit of quantization, is assumed to be 4×4. As shown in the FIG. 4B, the pixels in the current block are named as $C_{i,j}$, wherein i,j denotes the horizontal and vertical positions of the pixel in the block. Similarly, the pixels in the upper, left, right and lower blocks are labeled as $U_{i,j}$, $L_{i,j}$, $R_{i,j}$, and $D_{i,j}$, respectively. Those pixels indicated in FIG. 4B, i.e., the boundary and the neighboring pixels of the current block are used in estimating the class and the representative vector for the current block. That is to say, in case the class information and the codeword index for the current block are erroneous due to, e.g., a channel error, the neighboring pixels are used in estimating the class information and the representative vector for the current block as described hereinafter wherein the pixel values of the neighboring pixels are considered to be correct.

Figure 4B:
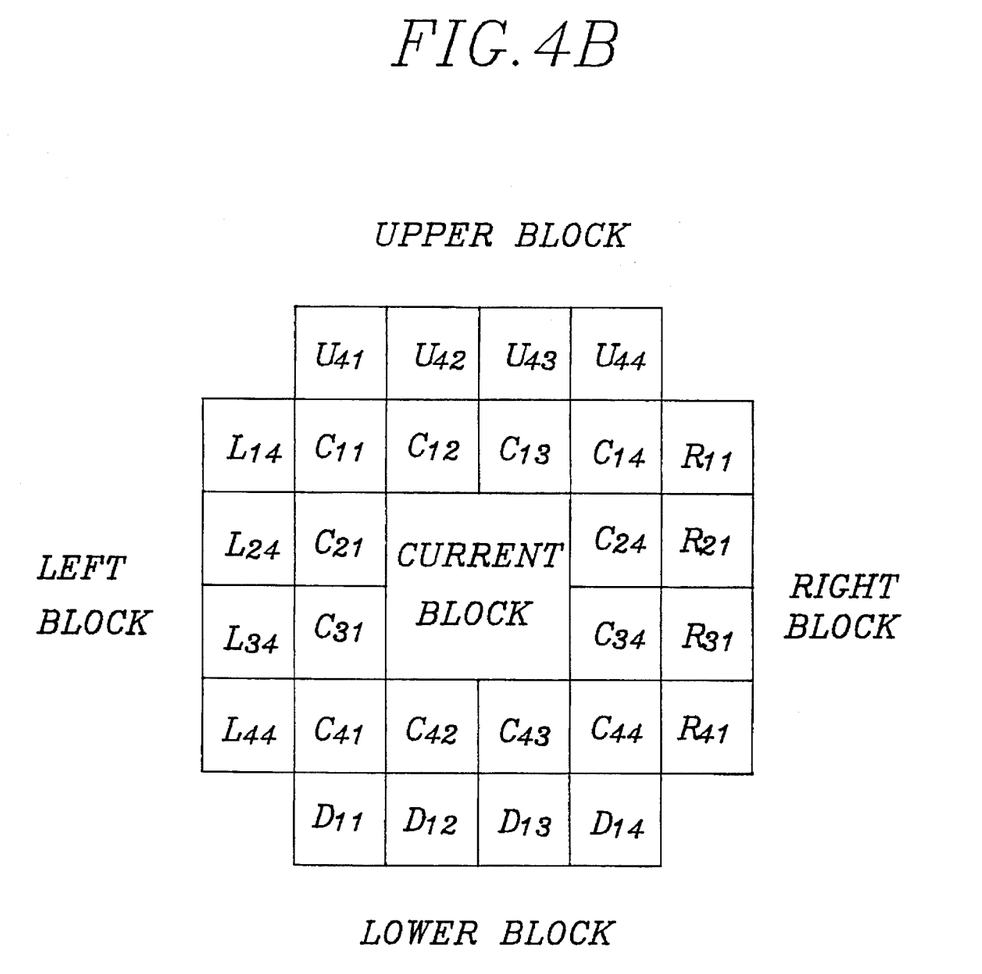

To estimate the class for the current block, the edge information for the current block is estimated first. To do so, the four groups of neighboring pixels in the four neighboring blocks are processed to determine if there is an edge or edges on the boundary of the current block.

Figure 5A:
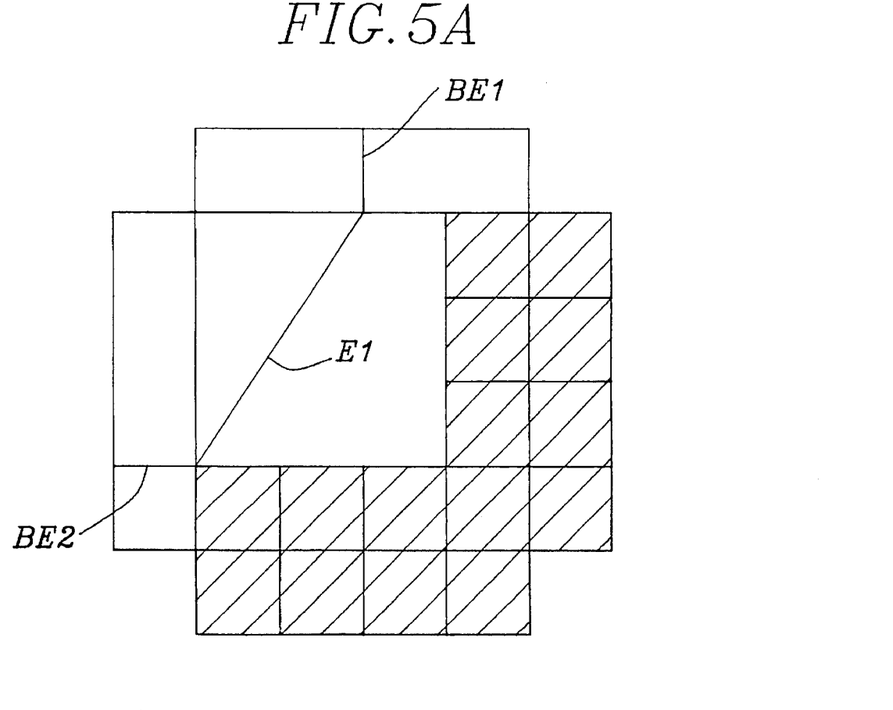
FIGS. 5A and 5B exemplify the boundary edges and corresponding edges for the current block which are detected in accordance with the present error concealing method.
Figure 5B:
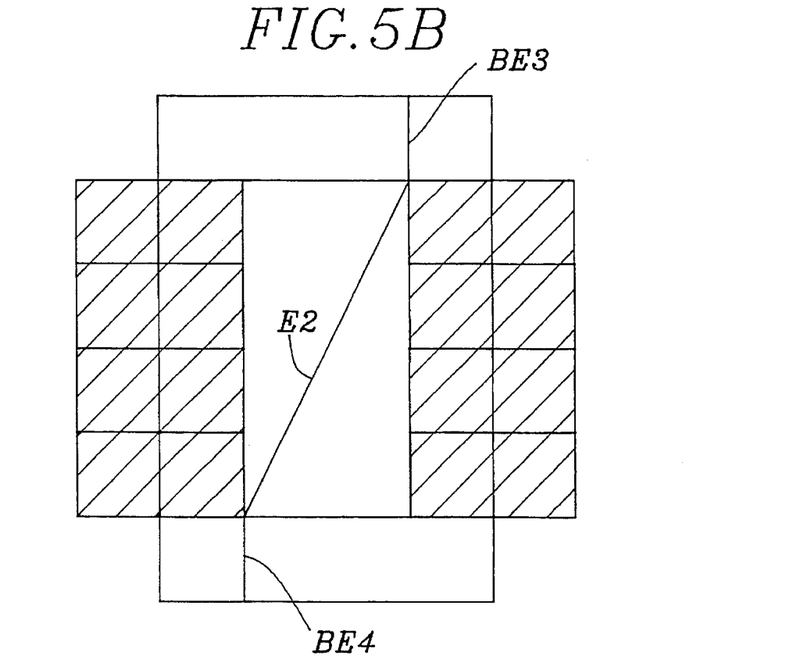

Specifically, the upper neighboring pixel group, i.e., $U_{41}$, $U_{42}$, $U_{43}$, $U_{44}$ of the upper block shown in FIG. 4B, is processed to detect a boundary edge. BE1 through BE4 shown in FIGS. 5A and 5B are examples of such boundary edges.

After the four groups of neighboring pixels are processed to detect boundary edges, the edge for the current block is estimated using the detected boundary edges.

If one boundary edge is detected on one side of the current block, the current block can be inferred to be smooth, and, therefore, can be categorized as class 15. If three or four boundary edges are found, the current block can be assumed to be complicated or textured, and can be categorized as class 16. In case the number of detected boundary edges is two, the current block can be assumed to have an edge, and classified as one of classes 1 to 14. The edge for the current block is determined by connecting the two boundary edges as shown in FIGS. 5A and 5B. Specifically, the edge E1 is determined by connecting the two boundary edges BE1 and BE2 as shown in FIGS. 5A. After the edge for the current block is determined, it is compared with each of the edge patterns shown in FIG. 2, to thereby select the most similar pattern as the class for the current block. As described above, the class for the current block can be estimated from the neighboring pixel values. The procedure of determining the class information described above is performed only for the block whose class information is incorrect.

If the codeword index for the current block is not erroneous, the pixel values, i.e., the representative vector for the current block is easily recovered by referencing the current codebook, i.e., the codebook for the estimated class for the current block and retrieving the representative vector corresponding to the codeword index.

However, in case that the codeword index is also erroneous, the correct representative vector for the current block is determined from one of the candidate vectors contained in the current codebook. A real image can be considered to be smooth in the sense that the pixel value does not change abruptly within adjacent pixels. Therefore, the representative vector which represents the most smooth boundaries can be chosen as the correct one by using, e.g., the well known side-matching method. In the side-matching method, the image at the boundaries between the current block and the four neighboring blocks is assumed to be smooth and the candidate vector which represents the most smooth boundaries is determined as the right one.

In case the current block class is one of the edged classes, e.g., classes 1 to 14 shown in FIG. 2, non-edged boundaries of the current block, i.e., boundaries not containing a boundary edge can be considered to be smoother than the edged boundaries of the current block, i.e., the boundaries with edges. In other words, differences between the boundary pixel values of the current block and the neighboring pixel values at the non-edged boundaries tend to be smaller than those at the edged boundaries. Therefore, in case the current block is one of the edged classes, only the pixel values at the non-edged boundaries are considered in calculating the side-matching function to obtain a more exact result.

Specifically, in case the upper and left boundaries are edged as shown in FIG. 5A, the side-matching function f(k) for the kth candidate vector in the current codebook can be defined as:

$$f(k) = \sum_{j=1}^{4} \{(C_{j4}(k) - R_{j1})^2 + (C_{4j}(k) - D_{1j})^2\} \quad \text{Eq. (1)}$$

wherein $C_{ij}(k)$ denotes the value of the boundary pixels in the current block obtained from the kth candidate vector in the current codebook; k is a positive integer ranging from 1 to m denoting the number of the candidate vectors in the current codebook; and $R_{ij}$ and $D_{ij}$ denote the neighboring pixels of the right and lower blocks as depicted in FIG. 4B. The pixel values of the neighboring blocks are considered to be correct and are fed from the image formatter 230 shown in FIG. 3.

In case the current block belongs to the non-edged classes, e.g., classes 15 and 16, the degree of smoothness of the four boundaries can be considered to be similar. Therefore, the pixel values at the four boundaries are considered in calculating the side-matching function. The side-matching function for the kth candidate vector in the current codebook can be defined as:

$$f(k) = \sum_{j=1}^{4} \{(C_{1j}(k) - U_{4j})^2 + \quad \text{Eq.(2)}$$

-continued $$(C_{jl}(k) - L_{j4})^2 + (C_{j4}(k) - R_{jl})^2 + (C_{4j}(k) - D_{lj})^2\}$$

wherein $C_{ij}$ (K) denotes the value of the pixel in the current block obtained from the kth candidate vector in the current codebook and $U_{ij}$, $L_{ij}$, $R_{ij}$ and $D_{ij}$ denote the neighboring pixels of the upper, left, right and lower blocks as depicted in FIG. 4B.

After the side-matching functions for all the candidate vectors in the current codebook have been calculated, the candidate vector which yields the smallest side-matching function is determined as the correct representative vector for the current block.

Using the above procedure, the correct representative vector for the current block can be chosen from the candidate vectors included in the current codebook by taking advantage of the fact that the image is locally smooth.

Figure 6:
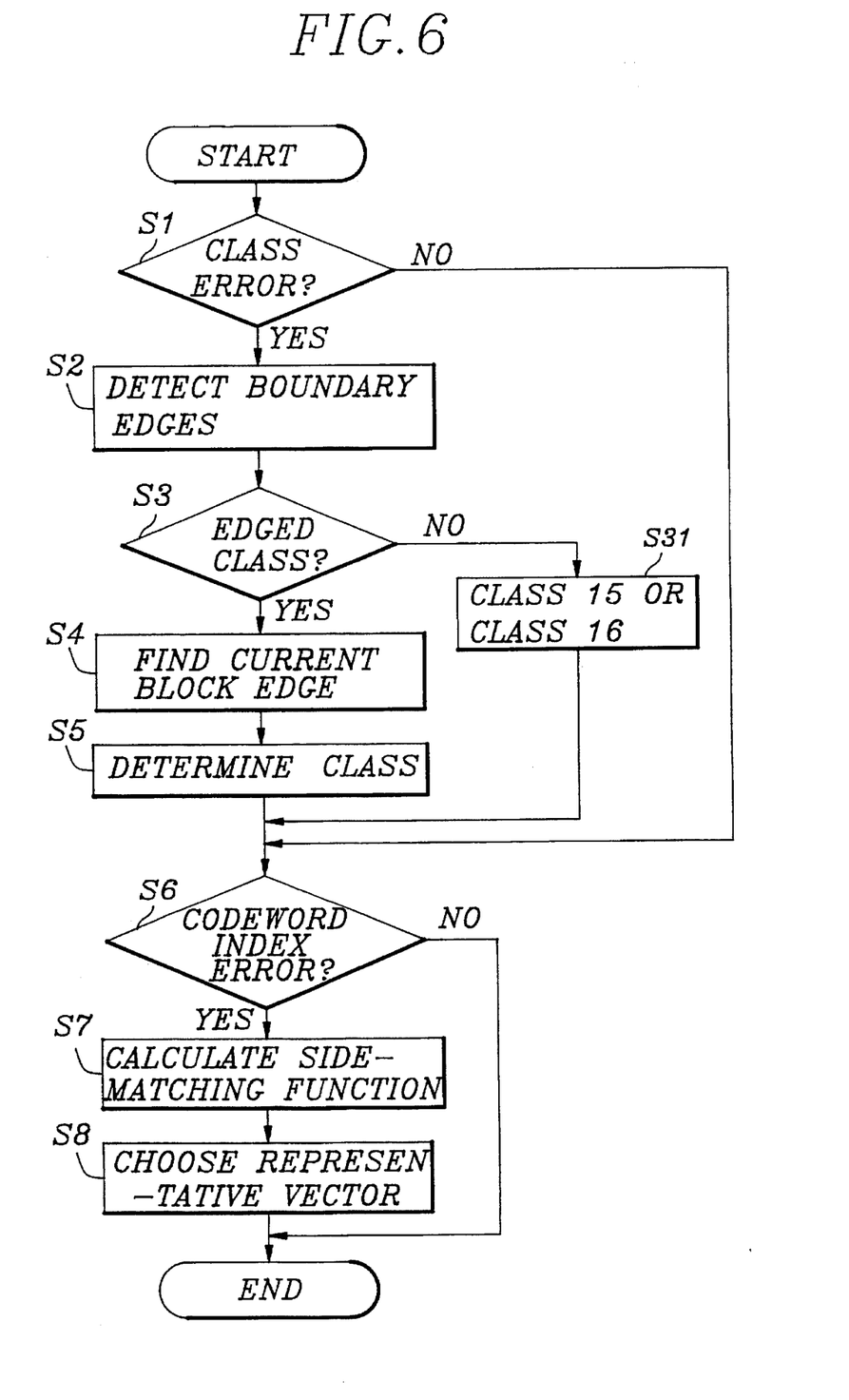
FIG. 6 presents a flow chart explaining the inventive error concealment method.

The above procedure to estimate the class and the representative vector for the current block is summarily shown in FIG. 6. The flow chart shows the procedure performed at the error correcting processor 240 to estimate the class and the representative vector for the current block in accordance with the present invention.

In step S1, the error information for the current block from the decoding circuit 210 is examined to determine if there exists an error or errors in the class information for the current block.

If there is no class error, steps S2 through S5 for estimating the class are skipped.

Otherwise, the four groups of neighboring pixels from the four neighboring blocks are processed to yield boundary edges in step S2. If the current block belongs to one of the edged classes, i.e., the number of the detected boundary edges is two, steps S4 and S5 are executed to determine the class, while the class for the block having 1,3 or 4 boundary edges is determined directly from the number of the boundary edges.

In step S4, the edge for the current block is determined by connecting two boundary edges. The edge for the current block is compared with each pattern of the edged classes to determine the class for the current block in step S5.

In case the representative vector is to be determined, i.e., if the error information for the current block indicates an error in the codeword index, steps S6 through S8 are performed to determine the correct representative vector for the current block. Specifically, the side-matching function of Eq. (1) or (2) is calculated depending on the class for the current block in step S7. After the side-matching functions for all the candidate vectors in the current codebook are calculated, the candidate vector which yields the smallest side-matching function is chosen as the right representative vector for the current block in step S8.

Although the present invention has been described with respect to a specific classified vector quantization scheme, the present method for detecting class error may be adapted to various other classified vector quantization schemes as well. Accordingly, while the present invention has been described with respect to the particular embodiments, it will be apparent to those skilled in the art that various changes and modifications may be made without departing from the spirit and scope of the invention as defined in the following claims.

What is claimed is:

1. A method, for use in an image signal decoding system, for concealing class errors in an image signal transmitted in a compressed form by using a classified vector quantization method, wherein the image signal is divided into a multiplicity of blocks, each of said blocks being classified into one of a plurality of classes based on an edge pattern of said each block and said classes including a non-edge class which corresponds to a block having no edge pattern therein and a texture class which corresponds to a block having more than one edge patterns therein, said method comprising the steps of:

detecting a block containing a class error;

detecting boundary edges at each of four groups of neighboring pixels to the class error containing block, wherein each group of the neighboring pixels is located at a boundary of the class error containing block and included in one of four contiguous blocks to the class error containing block, pixel values of the neighboring pixels being considered to be correct;

determining the non-edge class as a class of the class error containing block is less than two boundary edges are detected and the texture class, if more than two boundary edges are detected;

obtaining an edge pattern in the class error containing block by connecting the detected boundary edges if two boundary edges are detected;

determining the class for the class error containing block by selecting the most similar edge pattern to the obtained edge one, wherein said class is one of said plurality of classes; and repeating the above steps until classes all the blocks containing class errors are determined.

2. A method, for use in an image signal decoding system, for concealing channel errors in an image signal transmitted in a compressed form by using a classified vector quantization method, wherein the image signal is divided into a multiplicity of blocks, each of said blocks being classified into one of a plurality of classes based on an edge pattern of said each block, said classes including a non-edge class which corresponds to a block having no edge pattern therein and a texture class which corresponds to a block having more than one edge patterns therein, each of said classes corresponding to a codebook including a multiple number of candidate vectors, and each of the blocks included in the same class being represented by a representative vector selected from the candidate vectors included in the codebook corresponding to the class, said method comprising the steps of:

detecting a block containing a channel error;

detecting boundary edges at each of four groups of neighboring pixels to the channel error containing block, wherein each group of the neighboring pixels is located an a boundary of the channel error containing block and included in one of four contiguous blocks to the channel error containing block, pixel values of the neighboring pixels being considering to be correct;

determining the non-edge class as a class of the channel error containing block if less than two boundary edges are detected and the texture class, if more than two boundary edges are detected;

obtaining an edge pattern in the channel error containing block by connecting the detected boundary edges if two boundary edges are detected;

determining the class for the channel error containing block by selecting the most similar edge pattern to the obtained edge one, wherein said class is one of said plurality of classes;

calculating a multiple number of side-matching functions, each of said functions representing the difference between the boundary pixels of the channel error containing block and the neighboring pixels to the channel error containing block, wherein each of said side-matching functions is calculated for each of the multiple number of candidate vectors include in the codebook corresponding to the class where the channel error containing block belongs;

choosing the candidate vector producing the smallest side-matching function as the representative vector for the channel error containing block; and repeating the above steps until classes and representative vectors for all the blocks containing channel errors are determined.

* * * * *